United States Patent
Maruyama et al.

(10) Patent No.: US 10,128,505 B2
(45) Date of Patent: Nov. 13, 2018

(54) CARBON MATERIAL, ELECTRODE MATERIAL USING SAME AND METHOD OF MANUFACTURING SAME

(71) Applicant: THE YOKOHAMA RUBBER CO., LTD., Minato-Ku, Tokyo (JP)

(72) Inventors: Tsukasa Maruyama, Hiratsuka (JP); Tomoyuki Sakai, Hiratsuka (JP); Yoshimasa Imazaki, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 0 days.

(21) Appl. No.: 15/819,102

(22) Filed: Nov. 21, 2017

(65) Prior Publication Data
US 2018/0076457 A1    Mar. 15, 2018

Related U.S. Application Data

(63) Continuation of application No. 14/768,932, filed as application No. PCT/JP2014/053998 on Feb. 20, 2014.

(30) Foreign Application Priority Data
Feb. 20, 2013  (JP) ................. 2013-031180

(51) Int. Cl.
*H01M 4/60* (2006.01)
*H01M 4/587* (2010.01)
(Continued)

(52) U.S. Cl.
CPC ............ *H01M 4/602* (2013.01); *H01G 11/24* (2013.01); *H01G 11/32* (2013.01); *H01G 11/34* (2013.01);
(Continued)

(58) Field of Classification Search
CPC ..................................................... H01M 4/602
See application file for complete search history.

(56) References Cited

U.S. PATENT DOCUMENTS

| 2008/0042110 | A1* | 2/2008 | Kamakura | ............. H01G 11/32 252/511 |
| 2012/0171575 | A1* | 7/2012 | Wee | ..................... H01G 9/038 429/301 |
| 2014/0030594 | A1 | 1/2014 | Sakai et al. | |

FOREIGN PATENT DOCUMENTS

| JP | 2007-234346 A | 9/2007 |
| JP | 4294067 B2 | 7/2009 |

(Continued)

OTHER PUBLICATIONS

Translation of JP2012-023196A (Year: 2018).*

*Primary Examiner* — Sarah A. Slifka
*Assistant Examiner* — Brian R Ohara
(74) *Attorney, Agent, or Firm* — Carrier Blackman & Associates, P.C.; Joseph P. Carrier; Anne G. Sabourin

(57) ABSTRACT

A method of manufacturing a carbon material comprising a composite of a porous carbon material and a conductive polymer, in which a dispersion solution of the porous carbon material and a dispersion solution of the conductive polymer are mixed to make the composite of the porous carbon material and the conductive polymer. The carbon material has: a specific surface area of 750 to 3000 m²/g, a methylene blue adsorption performance of 150 mL/g or more, and at least three peaks in a range 1250 to 1700 cm$^{-1}$ of a spectrum obtained by laser Raman spectroscopy with an excitation wavelength of 532 nm.

6 Claims, 1 Drawing Sheet

(51) Int. Cl.
 *H01G 11/24* (2013.01)
 *H01G 11/32* (2013.01)
 *H01G 11/34* (2013.01)
 *H01G 11/38* (2013.01)
 *H01G 11/48* (2013.01)

(52) U.S. Cl.
 CPC ............ *H01G 11/38* (2013.01); *H01G 11/48* (2013.01); *H01M 4/587* (2013.01); *Y02E 60/13* (2013.01)

(56) References Cited

FOREIGN PATENT DOCUMENTS

| | | | |
|---|---|---|---|
| JP | 2011-121785 A | | 6/2011 |
| JP | 2012-023196 A | | 2/2012 |
| JP | 2012023196 A | * | 2/2012 |
| JP | 5041058 B2 | | 10/2012 |
| JP | 5110147 B2 | | 12/2012 |

* cited by examiner

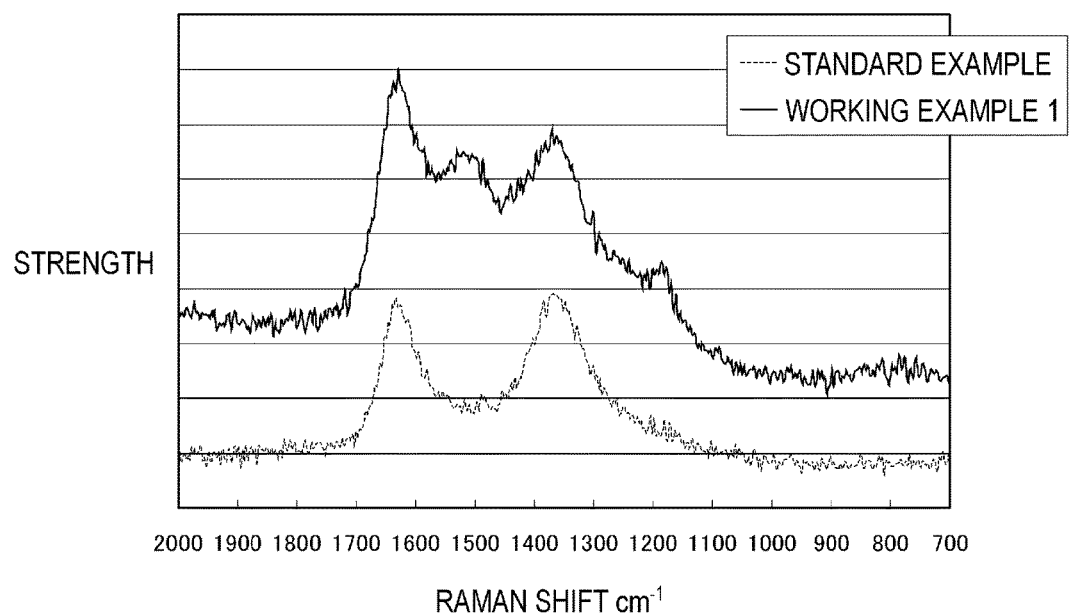

US 10,128,505 B2

CARBON MATERIAL, ELECTRODE MATERIAL USING SAME AND METHOD OF MANUFACTURING SAME

CROSS-REFERENCE TO RELATED APPLICATIONS

The present application is a continuation of prior U.S. patent application Ser. No. 14/768,932 filed 19 Aug. 2015 as the US National Phase of International Application PCT/JP2014/053998 filed 20 Feb. 2014, which claims priority based on Japanese Patent Application No. 2013-031180, filed 20 Feb. 2013. The entire disclosures of all of the above-mentioned prior US, International and Japanese patent applications are incorporated by reference herein.

BACKGROUND OF THE INVENTION

1. Field of the Invention

The present invention relates to a carbon material, an electrode material using same, and method of manufacturing same, and an electrochemical element.

2. Description of the Background Art

Lithium ion secondary batteries and electric double-layer capacitors are known as electrochemical elements.

Generally, in comparison to the electric double-layer capacitor, the lithium ion secondary battery has higher energy density and is capable of operation over a longer time interval.

On the other hand, in comparison to the lithium ion secondary battery, the electric double-layer capacitor is capable of rapid electrical charging and discharging, and working life over repeated uses is longer.

Also, in recent years a lithium ion capacitor that combines the advantages of both the lithium ion secondary battery and the electric double-layer capacitor has been developed as an electrochemical element, and in addition, from the perspective of cost, a sodium ion capacitor (sodium ion electrical storage device) has been developed.

For example, in Patent Document 1 the present applicants have provided "an electrode material for an electric double-layer capacitor using a polyaniline/carbon composite that is a composite of polyaniline or a derivative thereof with a carbonaceous material selected from activated carbon, ketjen black, acetylene black, and furnace black, wherein the polyaniline or derivative thereof is conductive polyaniline dispersed in a nonpolar organic solvent that is undoped by a base treatment" as an electric double-layer capacitor.

Also, likewise Patent Document 2 provides "a composite of a conductive polymer that includes a nitrogen atom and a porous carbon material, obtained by bonding the conductive polymer to the surface of the porous carbon material, and after mixing the conductive polymer and the porous carbon material, undoping by heat treatment at a temperature at least 20° C. lower than the decomposition temperature of the conductive polymer as measured by thermogravimetric analysis, wherein the total pore volume of all pores having a diameter of 0.5 to 100.0 nm measured by the BJH method is 0.3 to 3.0 cm$^3$/g, and the pore volume of pores having a diameter of 2.0 nm or more and less than 20.0 nm measured by the BJH method as a percentage of the total pore volume is 10% or more".

Furthermore, in Patent Document 3 the present applicants have provided as a lithium ion capacitor "an electrode material for a lithium ion capacitor, that includes a composite of a conductive polymer having a nitrogen atom and a porous carbon material as active material, obtained by bonding the conductive polymer to the surface of the porous carbon material, and after mixing the conductive polymer and the porous carbon material, undoping by heat treatment at a temperature at least 20° C. lower than the decomposition temperature of the conductive polymer as measured by thermogravimetric analysis, wherein the total pore volume of all pores having a diameter of 0.5 to 100.0 nm measured by the BJH method is 0.3 to 3.0 cm$^3$/g, and the pore volume of pores having a diameter of 2.0 nm or more and less than 20.0 nm measured by the BJH method as a percentage of the total pore volume is 10% or more".

PRIOR ART DOCUMENT

Patent Document

Patent Document 1: Japanese Patent No. 4294067
Patent Document 2: Japanese Patent No. 5110147
Patent Document 3: Japanese Patent No. 5041058

SUMMARY OF THE INVENTION

Problem to be Solved by the Invention

As a result of investigation into the electrode materials and composite materials described in Patent Documents 1 to 3, the present inventors discovered that there was scope for improving the electrostatic capacitance of the electrochemical element when, for example, using the electrode material or composite manufactured by scaled up production.

Therefore it is an object of the present invention to provide an electrode material and a carbon material used in the electrode material that enable an electrochemical element to be obtained with high electrostatic capacitance.

Means to Solve the Problem

As a result of diligent investigation by the inventors, it was found that an electrochemical element with high electrostatic capacitance could be obtained by using as the electrode material a carbon material having specific surface area and methylene blue adsorption performance within predetermined ranges, and, having a specific number of peaks in a predetermined Raman spectrum. Specifically, the present invention provides the following (1) to (9).

(1) A carbon material having a specific surface area of 750 to 3000 m$^2$/g,
having a methylene blue adsorption performance of 150 mL/g or more, and
having at least three peaks in a range 1250 to 1700 cm$^{-1}$ of a spectrum obtained by laser Raman spectroscopy with an excitation wavelength of 532 nm.

(2) The carbon material according to No. (1) above, having a zeta potential isoelectric point within a range pH 3.0 to pH 5.5.

(3) The carbon material according to No. (1) or (2) above, comprising a composite of a porous carbon material and a conductive polymer.

(4) The carbon material according to No. (3) above, wherein the conductive polymer is a conductive polymer that includes a nitrogen atom and/or a conductive polymer that includes a sulfur atom.

(5) The carbon material according to No. 4 above, wherein the conductive polymer that includes a nitrogen atom is at least one selected from the group consisting of polyaniline, polypyrrole, polypyridine, polyquinoline, polythiazole, polyquinoxaline, and derivatives thereof.

(6) The carbon material according to No. 4 or 5 above, wherein the conductive polymer that includes a sulfur atom is at least one selected from the group consisting of polythiophene, polycyclopentadithiophene, and derivatives thereof.

(7) The carbon material according to No. 3 above, wherein the conductive polymer is at least one selected from the group consisting of polyfluorene and derivatives thereof.

(8) An electrode material using the carbon material described in any one of Nos. 1 to 7 above.

(9) An electrochemical element using the electrode material described in No. 8 above.

Effect of the Invention

As described below, according to the present invention it is possible to provide an electrode material and a carbon material used in the electrode material that enable an electrochemical element with high electrostatic capacitance to be obtained.

BRIEF DESCRIPTION OF THE DRAWING

FIG. 1 is a chart showing the Raman spectrum of a carbon material prepared in Working Example 1 and a Standard Example.

BEST MODE FOR CARRYING OUT THE INVENTION

[Carbon Material]

The carbon material according to the present invention is a carbon material that has a specific surface area of 750 to 3000 m$^2$/g, has a methylene blue adsorption performance of 150 mL/g or more, and has at least three peaks in the range 1250 to 1700 cm$^{-1}$ in a spectrum obtained by laser Raman spectroscopy with an excitation wavelength of 532 nm (hereafter simply referred to as "Raman spectrum").

Here, "specific surface area" refers to the value obtained from a measurement taken using the nitrogen adsorption BET method in accordance with the method stipulated in JIS K 1477: 2007.

Here, "methylene blue adsorption performance" refers to the value calculated from the amount of methylene blue solution adsorbed, in accordance with the activated carbon test method prescribed in JIS K 1474: 2007.

Also, the "Raman spectrum" refers to a spectrum for light scattered as per the Raman effect that indicates how strongly a particular wavelength of light is scattered, and in the present invention it refers to the spectrum measured with an excitation wavelength of 532 nm using a micro laser Raman spectrograph HoloLab 5000R (Kaiser Optical Systems Inc.).

By using such carbon material as an electrode material, it is possible to obtain an electrochemical element with high electrostatic capacitance.

The reasons for this are not entirely clear, however the present inventors have inferred the following.

First, the range of the specific surface area of the carbon material according to the present invention (750 to 3000 m$^2$/g) is prescribed to be about the same as the specific surface area of porous carbon materials such as activated carbon and the like, and as indicated by the Working Examples and Comparative Examples described below, is prescribed to be different than the specific surface area of the electrode material disclosed in Patent Document 1.

Also, the value of the methylene blue adsorption performance of the carbon material according to the present invention is prescribed to have a similar value to that of porous carbon material, the same as for the specific surface area, and as indicated by the Working Examples and Comparative Examples described below, is prescribed to have a different methylene blue adsorption performance to that of the electrode material disclosed in Patent Document 1.

Also, the prescription of the Raman spectrum of the carbon material according to the present invention (at least three peaks within the range 1250 to 1700 cm$^{-1}$) means that there is at least one peak apart from the peaks originating from the SP$^2$ carbon bond in commonly known carbon materials (for example, activated carbon, carbon black, and the like) at about 1350 cm$^{-1}$ and about 1600 cm$^{-1}$, which prescribes that the carbon material according to the present invention is not made from porous carbon material only.

From the above, regardless of the fact that the carbon material according to the present invention has surface properties that are similar to those of porous carbon materials, it is considered that organic material (for example, conductive polymers as described below) exists selectively in the interior thereof (for example, within the pores of the porous carbon material), so there is no contact resistance, there is no hindrance to the adsorption (intercalation) of supporting electrolyte that exists within the electrolyte, so it is possible to increase the electrostatic capacitance.

From the point of view of the adsorption and desorption of supporting electrolyte, preferably the specific surface area of the carbon material according to the present invention is 750 to 2800 m$^2$/g, and more preferably is 800 to 2600 m$^2$/g.

Also, preferably the isoelectric point of the carbon material according to the present invention is within the range pH 3.5 to pH 5.0.

Also, in order to provide an electrode material that can enable an electrochemical element with an even higher electrostatic capacitance to be obtained, preferably the carbon material according to the present invention has a methylene blue adsorption performance of 150 to 300 mL/g, and more preferably 160 to 300 mL/g.

Also, in order to provide an electrode material that can enable an electrochemical element with an even higher electrostatic capacitance to be obtained, preferably the carbon material according to the present invention has a zeta potential isoelectric point within the range pH 3.0 to pH 5.5.

Here "zeta potential isoelectric point" refers to the pH at zero zeta potential measured by laser Doppler electrophoresis, in accordance with the method of measurement of the isoelectric point prescribed by JIS R 1638:1999.

Also, the range of the zeta potential isoelectric point (pH 3.0 to pH 5.5) is prescribed to be similar to that of the isoelectric point of porous carbon materials, the same as for the specific surface area, and as indicated by the Working Examples and Comparative Examples described below, is prescribed to have a different isoelectric point to that of the electrode material disclosed in Patent Document 1.

Also, the carbon material according to the present invention can maintain semi-permanent charging and discharging properties and high-speed charging and discharging properties, and to provide an electrode material that enables an electrochemical element with even higher electrostatic capacitance to be obtained, preferably it is made from a composite of a porous carbon material and a conductive polymer as described below.

The expression "composite" generally means a material resulting from compositing and integrating (combining two or more materials), however in the present invention it refers to the state in which at least a portion of the conductive polymer is adsorbed inside the pores of the porous carbon material.

<Conductive Polymer>

No particular limitation is placed on the conductive polymer from which the composite is configured as long as it displays electrical conductivity (for example, electrical conductivity of $10^{-9}$ Scm$^{-1}$ or more) by introduction of a dopant. The polymer may be doped by a dopant or may be a polymer obtained by undoping a polymer, for example it may be a conductive polymer that contains a nitrogen atom (hereafter referred to as a "nitrogen-containing conductive polymer"), a conductive polymer containing a sulfur atom (hereafter referred to as a "sulfur-containing conductive polymer"), or a polyfluorene derivative, and the like.

Of these, a nitrogen-containing conductive polymer or a sulfur-containing conductive polymer described below is preferable for reasons of electrochemical stability and ease of procurement.

Specific examples of nitrogen-containing conductive polymer include polyaniline, polypyrrole, polypyridine, polyquinoline, polythiazole, polyquinoxaline, and derivatives and the like thereof. One of these may be used alone, or two or more may be used in combination.

Specific examples of sulfur-containing conductive polymer include polythiophene, polycyclopentadithiophene, and derivatives and the like thereof. One of these may be used alone, or two or more may be used in combination.

Among these, nitrogen-containing conductive polymer are preferred, and polyaniline, polypyridine, and derivatives thereof are more preferred due to low cost of the raw materials and ease of synthesis.

In order not to block the pores of the porous carbon material, and, in order to exhibit stable charging and discharging properties, preferably the average molecular weight of the a conductive polymer is 1000 to 2,000,000, more preferably is 3000 to 1,500,000, and still more preferably is 5000 to 1,000,000.

Here, the average molecular weight is measured using gel permeation chromatography (GPC), and refers to the value converted with polystyrene of known molecular weight, or, the value measured by a light scattering method (static light scattering method).

Also, there is no particular limitation on the method of preparing the conductive polymer, it can be manufactured as a dispersion of the conductive polymer, by chemical polymerization (for example, oxidative polymerization, dehalogenation polymerization, and the like) of the corresponding monomer (for example aniline, pyridine, and the like) in a non-polar solvent or an aprotic solvent.

The aforementioned dopants or additives for chemical polymerization (for example, oxidizing agents, molecular weight adjustment agents, phase transfer catalysts, or the like) can be any of those disclosed in Patent Document 1.

Also, a commercially available product can be used as the conductive polymer.

Specific commercially available products include, for example, polyaniline organic solvent dispersion manufactured by Nissan Chemical Industries, Ltd. (trade name: Ormecon), polyaniline aqueous dispersion manufactured by Nissan Chemical Industries, Ltd., polyaniline dispersion manufactured by Kaken Sangyo K.K (toluene dispersion, aqueous dispersion), polyaniline xylene dispersion manufactured by Sigma-Aldrich Co. Llc., polythiophene dispersion manufactured by Shin-Etsu Polymer Co., Ltd. (trade name: SEPLEGYDA), polythiophene dispersion manufactured by Sigma-Aldrich Co. Llc. (product numbers: 483095, 739324, 739332, and the like), polypyrrole dispersion manufactured by Japan Carlit Co., Ltd., and the like.

<Porous Carbon Material>

Preferably the porous carbon material which constitutes the composite is a carbon material having a specific surface area of 750 to 3000 m$^2$/g.

Specific examples of the porous carbon material include activated carbon, carbon black, carbon nanotubes, porous carbon material containing boron, porous carbon material containing nitrogen. One of these may be used alone, or two or more may be used in combination.

Of these, for reasons of ease of procurement, the porous carbon material is preferably at least one selected from the group consisting of activated carbon, carbon black, and carbon nanotubes.

Here, there is no particular limitation on the activated carbon, and known activated carbon particles that are used in carbon electrodes and the like can be used. Specific examples include activated carbon particles or fibers obtained by activating coconut shell, wood dust, petroleum pitch, phenolic resins, and the like using water vapor, various chemicals, alkali, and the like. One of these may be used alone, or two or more may be used in combination.

Also, there is no particular limitation on the carbon black, and fine carbon particulates used in the electrode material of known electric double-layer capacitors can be used. Specific examples include furnace black, channel black, lamp black, thermal black, and the like.

Also, there is no particular limitation on the carbon nanotubes, and carbon in fiber form used in the electrode material of known electric double-layer capacitors can be used, and it may be single-layer carbon nanotubes with one graphene sheet layer, or it may be multilayer carbon nanotubes with two or more graphene sheets.

[Method of Manufacturing the Carbon Material]

There is no particular limitation on the method of manufacturing the carbon material according to the present invention, but for example each of the following methods are methods of preparing a composite made from the conductive polymer and the porous carbon material as described above.

<Method of Preparing the Composite (No. 1)>

The composite of the conductive polymer and the porous carbon material can be produced by preparing a dispersion solution of the porous carbon material in a solvent (for example, a non-polar solvent such as toluene or the like) (hereafter referred to as "porous carbon material dispersion"), heating to about 90 to 130° C. to reduce the viscosity of the solvent, then adding a dispersion in which the conductive polymer is dispersed in advance in a solvent (for example, a non-polar solvent such as toluene or the like) (hereafter referred to as "conductive polymer dispersion"), and after mixing these, dopant is removed by undoping as necessary.

Examples of methods of undoping include a method of base treatment that can neutralize the dopant and thereby undope the doped conductive polymer, a method of heat treatment of the dopant at a temperature that does not damage the conductive polymer, and the like. Specifically, the methods disclosed in Patent Documents 2 and 3 can be adopted.

<Method of Preparing the Composite (No. 2)>

The composite of the conductive polymer and the porous carbon material can be produced by preparing the porous carbon material dispersion and the conductive polymer dispersion as described in the Method of Preparing (No. 1), and after mixing the conductive polymer dispersion that has been processed in advance in a high-pressure homogenizer, and the porous carbon material dispersion in a high-pressure homogenizer, dopant is removed by undoping as necessary.

<Method of Preparing the Composite (No. 3)>

The composite of the conductive polymer and the porous carbon material can be produced by mixing a dispersion solution of the porous carbon material dispersed in a solvent (for example, a non-polar solvent such as toluene or the like) and a dispersion of the conductive polymer in a solvent (for example, a non-polar solvent such as toluene or the like), then dopant is removed by undoping as necessary.

[Electrode Material and Electrochemical Element]

The electrode material according to the present invention is an electrode material that uses the carbon material according to the present invention as described above as the active material, and it can be advantageously used as the electrode material of, for example, electrochemical elements (for example, electric double-layer capacitors, lithium ion secondary batteries, lithium ion capacitors, sodium ion capacitors, and the like).

Specifically, the electrode material according to the present invention can be advantageously used in the electrode material of the polarizable electrode of an electric double-layer capacitor, the negative electrode of the lithium ion secondary battery, the negative electrode of the lithium ion capacitor, and the like.

The electrochemical element according to the present invention uses the electrode material according to the present invention as described above, and can otherwise adopt a conventionally known configuration, and can be manufactured by conventional commonly known manufacturing methods.

EXAMPLES

The present invention will now be described in detail using the following examples, but is in no way restricted to these examples.

<Preparation of Polyaniline Toluene Dispersion>

135 g of aniline, 330 g of dodecyl benzene sulfonic acid, and 0.15 g of 2,4,6-trimethylaniline (0.001 equivalent weight relative to the aniline) as a molecular weight adjustment agent (terminal sealing agent) were dissolved in 3000 g of toluene. Thereafter, to this mixture was added 800 g of distilled water into which was dissolved 250 mL of 6N hydrochloric acid.

To the mixed solution, 30 g of tetrabutyl ammonium bromide was added, the mixture was cooled to 5° C. or less, then 1200 g of distilled water, in which 315 g of ammonium persulfate was dissolved, was added.

The mixture was oxidatively polymerized in a state of 5° C. or less for 6 hours, then a methanol and water mixed solvent (water/methanol=2/3 (mass ratio)) were added thereto, and the resultant mixture was stirred.

After the end of stirring, the reaction solution was separated into the toluene layer and the aqueous layer, and only the aqueous layer was removed so as to obtain a polyaniline toluene dispersion.

Part of the polyaniline toluene dispersion was sampled, and the toluene was removed by vacuum distillation to determine solid content in the dispersion as 13 mass % (polyaniline content=4.3 mass %, polyaniline number average molecular weight=100,000).

Moreover, there was no plugging when this dispersion was filtered through a 1.0 μm pore diameter filter. The polyaniline particle diameter in the dispersion was analyzed using an ultrasonic particle size distribution measurement apparatus (APS-100, manufactured by Matec Applied Sciences). The polyaniline particles were found to be uniform (peak value=0.19 μm, half-value width=0.10 μm).

Furthermore, this dispersion did not agglomerate or precipitate even after the elapse of 1 year at room temperature, and thus was stable. From the elemental analysis, the molar ratio of the dodecyl benzenesulfonic acid per aniline monomer unit was 0.45. The yield of the polyaniline obtained was 95%.

<Preparation of Polypyridine Aqueous Dispersion>

To 50 g of dry dimethyl formaldehyde were dissolved 5 g of 2,5-dibromopyridine, 0.5 g of 2-bromopyridine as a molecular weight adjustment agent (0.15 equivalent weight relative to the pyridine monomer), 9 g of bis(1,5-cyclooctadiene)nickel as a polycondensation agent. Thereafter, the polymerization reaction was performed for 16 h at 60° C. under nitrogen.

After completion of the reaction, polypyridine was purified by the below-described operation.

Firstly, the reaction solution was poured into 200 mL of 0.5 mol/L hydrochloric acid aqueous solution. After stirring for 2 h at room temperature, the precipitate was filtered out and recovered.

Thereafter, the recovered precipitate was stirred again in 200 mL of 0.5 mol/L hydrochloric acid aqueous solution for 8 h at room temperature, and the precipitate was filtered out and recovered.

Thereafter, the recovered precipitate was stirred in 200 mL of 0.1 mol/L ammonium aqueous solution for 3 h at room temperature to isolate and purify the polypyridine.

The obtained polypyridine powder was dried under vacuum. 1.72 g was recovered (92% yield).

A polypyridine formic acid solution was prepared beforehand by dissolving 0.8 g of polypyridine powder in 9.2 g of 88% formic acid. This polypyridine formic acid solution and 15 g of 18% polystyrene sulfonate aqueous solution were mixed and stirred. Thereafter, 175 g of distilled water was added to prepare a polypyridine aqueous dispersion (polypyridine content=0.4 mass %; polypyridine number average molecular weight=10,000).

The particle size of the polypyridine particles in the dispersion was analyzed by an ultrasonic particle size distribution measurement apparatus (manufactured by Matec Applied Sciences, APS-100). As a result, it was learned that the particle size distribution was uniform (peak value of 0.25 μm, half width of 0.12 μm).

<Preparation of Polypyrrole Toluene Dispersion>

To 150 g of toluene were dissolved 3 g of pyrrole, 12.0 g of dodecyl benzene sulfonic acid, and 0.15 g of 2-methyl pyrrole as a molecular weight adjustment agent (terminal sealing agent). Thereafter, 75 g of distilled water was added into which had been dissolved 5.36 mL of 6N hydrochloric acid.

To this mixed solvent, 0.9 g of tetrabutylammonium bromide was added, oxidative polymerization was carried out for 6 hours at 0° C. or lower, then 100 g of toluene followed by a methanol/water mixed solvent (methanol: water=2:3 (mass ratio)) was added, and the mixture was stirred.

After the end of stirring, the reaction solution was separated into the toluene layer and the aqueous layer, and only the aqueous layer was removed so as to obtain a polypyrrole toluene dispersion.

A portion of the polypyrrole toluene dispersion was sampled, and when vacuum distillation of the toluene was performed, it was found that the solid content in the dispersion was 4.1 mass % (polypyrrole content: 1.2 mass %). Furthermore, this dispersion was filtered through a 1.0 μm pore diameter filter, whereupon there was no clogging. Furthermore, this dispersion did not agglomerate or precipitate even after the elapse of 1 year at room temperature, and thus was stable. From the elementary analysis, the molar ratio of the dodecyl benzene sulfonic acid per anionic monomer unit was 0.95. The yield of the polypyrrole obtained was 94%.

<Preparation of Polythiophene Toluene>

Poly(3-dodecylthiophene-2,5-diyl) (manufactured by Sigma-Aldrich Co. Llc., average molecular weight 60,000) dispersed in toluene was used (solid content 1.2 mass %).

<Preparation of Polyfluorene Toluene Dispersion>

Poly(9,9'-didodecylfluorenyl-2,7-diyl) (manufactured by Sigma-Aldrich Co. Llc.) dispersed in toluene was used (solid content 1.2 mass %).

Working Examples 1 to 7 (Method of Preparing A)

Initially, an activated carbon toluene dispersion was prepared by dispersing 300 g of activated carbon (NY1151, specific surface area 1325 m$^2$/g, primary average particle size: 5 μm, specific resistance: $1.5 \times 10^{-1}$ Ω·cm, manufactured by Kurarey Chemical) in 1000 g of toluene.

Next, a polyaniline toluene dispersion (polyaniline content: 4.3 mass %) that was prepared in advance was added to the activated carbon toluene dispersion that was heated to 100° C. so that the blending quantity of polyaniline was the value (number within brackets) shown in Table 1, to prepare a mixed dispersion in which these were mixed.

To this mixed dispersion 30 mL of triethylamine was added, then mixing by stirring was carried out for 5 hours.

After the end of the stirring, the precipitate was recovered by filtration and washed with methanol. The filtrate and the washed solution at this time were colorless and transparent.

The carbon material made from the polyaniline/activated carbon composite was prepared by vacuum drying the washed and purified precipitate.

Working Example 8 (Method of Preparing A)

The carbon material made from polypyridine/activated carbon composite was prepared by the same method as that of Working Example 1, except that polypyridine aqueous dispersion prepared in advance was used instead of the polyaniline toluene dispersion. Note that, as described below, in the case of the carbon material prepared in Working Example 8, an electric double-layer capacitor with an electrode for evaluation disposed in the negative electrode was prepared.

Working Example 9 (Method of Preparing A)

The carbon material made from polypyrrole/activated carbon composite was prepared by the same method as that of Working Example 1, except that polypyrrole toluene dispersion prepared in advance was used instead of the polyaniline toluene dispersion.

Working Example 10 (Method of Preparing A)

The carbon material made from polythiophene/activated carbon composite was prepared by the same method as that of Working Example 1, except that polythiophene toluene dispersion prepared in advance was used instead of the polyaniline toluene dispersion, and the undoping process using triethylamine was not carried out.

Working Example 11 (Method of Preparing A)

The carbon material made from polyfluorene/activated carbon composite was prepared by the same method as that of Working Example 1, except that polyfluorene toluene dispersion prepared in advance was used instead of the polyaniline toluene dispersion.

Working Examples 12 to 14 (Method of Preparing B)

Initially, an activated carbon methanol dispersion was prepared by dispersing 300 g of activated carbon (NY1151, specific surface area 1325 m$^2$/g, primary average particle size: 5 μm, specific resistance: $1.5 \times 10^{-1}$ Ω·cm, manufactured by Kurarey Chemical) in 1000 g of methanol.

Next, a polyaniline toluene dispersion (polyaniline content: 4.3 mass %) that was prepared in advance was added to the activated carbon methanol dispersion so that the blending quantity of polyaniline was the value (number within brackets) shown in Table 1, to prepare a mixed dispersion in which these were mixed.

To this mixed dispersion 30 mL of triethylamine was added, then mixing by stirring was carried out for 5 hours.

After the end of the stirring, the precipitate was recovered by filtration and washed with methanol. The filtrate and the washed solution at this time were colorless and transparent.

The carbon material made from the polyaniline/activated carbon composite was prepared by vacuum drying the washed and purified precipitate.

Working Examples 15 to 17 (Method of Preparing C)

Initially, an activated carbon toluene dispersion was prepared by dispersing 300 g of activated carbon (NY1151, specific surface area 1325 m$^2$/g, primary average particle size: 5 μm, specific resistance: $1.5 \times 10^{-1}$ Ω·cm, manufactured by Kurarey Chemical) in 1000 g of toluene.

Next, a polyaniline toluene dispersion (polyaniline content: 4.3 mass %) that was processed in advance in a high-pressure homogenizer (Star Burst Labo manufactured by Sugino Machine Ltd., pressure: 150 MPa, chamber nozzle diameter: ϕ0.75 mm) was added to the activated carbon toluene dispersion so that the blending quantity of polyaniline was the value (number within brackets) in the following Table 1, and the mixed dispersion in which these were mixed was prepared by further processing thereof in a high pressure homogenizer (Star Burst Labo manufactured by Sugino Machine Ltd., pressure: 150 MPa, chamber nozzle diameter ϕ0.75 mm).

To this mixed dispersion 30 mL of triethylamine was added, then mixing by stirring was carried out for 5 hours.

After the end of the stirring, the precipitate was recovered by filtration and washed with methanol. The filtrate and the washed solution at this time were colorless and transparent.

The carbon material made from the polyaniline/activated carbon composite was prepared by vacuum drying the washed and purified precipitate.

Working Example 18

The carbon material made from polyaniline/activated carbon composite was prepared by the same method (method of preparing A) as that of Working Example 1, except that activated carbon and polyaniline was added so that the blending quantities were the values (polyaniline value within brackets) indicated in the following Table 1.

Working Example 19

The carbon material made from polyaniline/activated carbon composite was prepared by the same method (method of preparing B) as that of Working Example 12, except that activated carbon and polyaniline was added so that the blending quantities were the values (polyaniline value within brackets) indicated in the following Table 1.

Working Example 20

The carbon material made from polyaniline/activated carbon composite was prepared by the same method (method of preparing C) as that of Working Example 15, except that activated carbon and polyaniline was added so that the blending quantities were the values (polyaniline value within brackets) indicated in the following Table 1.

Comparative Examples 1 to 7 (Method of Preparing D)

A mixed dispersion was obtained by adding the quantity indicated in the following Table 1 of activated carbon (NY1151, specific surface area: 1325 m$^2$/g, primary average particle size: 5 μm, specific resistance: $1.5 \times 10^{-1}$ Ω·cm, manufactured by Kurarey Chemical) to the quantity indicated in the following Table 1 of polyaniline toluene dispersion.

To the mixed dispersion, 120 mL of a 2 mol/L triethylamine in methanol solution was added, then the mixture was stirred and mixed for 5 hours.

After the end of the stirring, the precipitate was recovered by filtration and washed with methanol. The filtrate and the washed solution at this time were colorless and transparent.

The carbon material made from the polyaniline/activated carbon composite was prepared by vacuum drying the washed and purified precipitate.

Standard Example

Activated carbon (NY1151, specific surface area: 1325 m$^2$/g, primary average particle size: 5 μm, specific resistance: $1.5 \times 10^{-1}$ Ω·cm, manufactured by Kurarey Chemical) was used as the Standard Example of the carbon material.
<Surface Properties, and the Like>
For each of the carbon materials prepared, the specific surface area, the zeta potential isoelectric point, the Raman spectrum, and the methylene blue adsorption performance were measured by the methods indicated below. These results are shown below in Table 1.
(Specific Surface Area)
This was measured using the nitrogen adsorption BET method, using a high precision gas/steam adsorption measurement device (BELSORP-max, manufactured by Bell Japan Inc.), in accordance with the test method prescribed by JIS K 1477:2007.
(Zeta Potential Isoelectric Point)
The pH at zero zeta potential was measured by measuring the zeta potential by laser doppler electrophoresis using a zeta potential measurement system (ELSZ-1000ZS, manufactured by Otsuka Electronics Co., Ltd.), in accordance with the method of isoelectric point measurement prescribed by JIS R 1638:1999.
(Raman Spectrum)
The Raman spectrum was measured with an excitation wavelength of 532 nm using a micro laser Raman spectrograph HoloLab 5000R (manufactured by Kaiser Optical Systems Inc.). Note that the charts of the Raman spectrum of the carbon material produced for Working Example 1 and the Standard Example are shown in FIG. 1.
(Methylene Blue Adsorption Performance)
The quantity of methylene blue solution adsorbed was calculated using a spectrophotometer (UH5300, manufactured by Hitachi Ltd.), in accordance with the method of testing activated carbon prescribed by JIS K 1474:2007.
<Electrostatic Capacitance>
With each of the carbon materials prepared, conduction aid (acetylene black) and binding agent (polyfluorethylene resin) were mixed and dispersed in the mass ratio 85:10:5, and then they were formed into sheet form using a pressure roll. Discs (diameter 1.6 cm) were cut from each of the sheets obtained, and each of the evaluation electrodes (25 mg) were produced.

For each of the electric double-layer capacitors produced using each of the evaluation electrodes as positive electrodes, the electrostatic capacitance was measured using a three-electrode model test cell manufactured by Toyo System Co., Ltd. A solution of tetraethylammonium tetrafluoroborate in propylene carbonate with a concentration of 1.0 mol/L was used as the electrolyte solution. Note that for the reference electrode, silver wire (vs. Ag/Ag$^+$) was used.

For the negative electrodes, the activated carbon, the conduction aid (acetylene black), and the binding agent (polyfluorethylene resin) were mixed and dispersed in the mass ratio 85:10:5, and then formed into sheet form using a pressure roll, and discs (diameter 1.6 cm) were cut from the sheets obtained to produce the electrodes (30 mg). Note that a separator (glass fiber paper manufactured by Nippon Sheet Glass Co., Ltd. was interposed between the positive electrodes and the negative electrodes.

Meanwhile, as stated above, for Working Example 8 an evaluation electrode produced by the same method as described above was used as the negative electrode, and for the positive electrode the activated carbon, the conduction aid (acetylene black), and the binding agent (polyfluorethylene resin) were mixed and dispersed in the mass ratio 85:10:5, and then formed into sheet form using a pressure roll, and discs (diameter 1.6 cm) were cut from the sheet to produce the electrode (30 mg), and otherwise the electric double-layer capacitor was produced by the same method as described above, and the electrostatic capacitance was measured.

TABLE 1

| | Standard Example | Working Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Activated carbon | 85 | 84 | 82 | 80 | 78 | 76 | 74 | 70 | 76 | 76 | 76 | 76 |
| Polyaniline | — | 23.3 (1) | 69.8 (3) | 116.3 (5) | 162.8 (7) | 209.3 (9) | 255.8 (11) | 348.8 (15) | — | — | — | — |

TABLE 1-continued

| | | | | | | | | | | | | |
|---|---|---|---|---|---|---|---|---|---|---|---|---|
| toluene dispersion (polyaniline content = 4.3 mass %) | | | | | | | | | | | | |
| Polypyridine aqueous dispersion (polypyridine content = 0.4 mass %) | — | — | — | — | — | — | — | — | — | 2250 (9) | — | — |
| Polypyrrole toluene dispersion (polypyrrole content = 1.2 mass %) | — | — | — | — | — | — | — | — | — | 750 (9) | — | — |
| Polythiophene toluene dispersion (polythiophene content = 1.2 mass %) | — | — | — | — | — | — | — | — | — | — | 750 (9) | — |
| Polyfluorene toluene dispersion (polyfluorene content = 1.2 mass %) | — | — | — | — | — | — | — | — | — | — | — | 750 (9) |
| Method of preparing | — | A | A | A | A | A | A | A | A | A | A | A |
| Specific surface area (m²/g) | 1390 | 1370 | 1260 | 1180 | 1100 | 1010 | 920 | 840 | 1040 | 1030 | 1000 | 1020 |
| Zeta potential isoelectric point (pH) | 5.2 | 4.5 | 4.6 | 4.7 | 4.8 | 4.8 | 4.9 | 5.0 | 4.8 | 4.7 | 4.8 | 4.8 |
| No. of peaks in the Ramen spectrum (No.) (measurement range: 1250 to 1700 cm$^{-1}$) | 2 | 3 | 3 | 3 | 3 | 3 | 3 | 3 | 3 | 3 | 3 | 3 |
| Methylene blue adsorption performance (mL/g) | 320 | 270 | 240 | 210 | 190 | 180 | 160 | 150 | 180 | 170 | 180 | 170 |
| Electrostatic capacitance (F/g) | 106 | 127 | 128 | 129 | 131 | 132 | 130 | 129 | 131 | 131 | 128 | 127 |

| | Standard | Working Example | | | | | | | | |
|---|---|---|---|---|---|---|---|---|---|---|
| | Example | 12 | 13 | 14 | 15 | 16 | 17 | 18 | 19 | 20 |
| Activated carbon | 85 | 84 | 78 | 70 | 84 | 78 | 70 | 65 | 65 | 65 |
| Polyaniline toluene dispersion (polyaniline content = 4.3 mass %) | — | 23.3 (1) | 162.8 (7) | 348.8 (15) | 23.3 (1) | 162.8 (7) | 348.8 (15) | 465.1 (20) | 465.1 (20) | 465.1 (20) |
| Method of preparing | — | B | B | B | C | C | C | A | B | C |
| Specific surface area (m²/g) | 1390 | 1320 | 1090 | 790 | 1340 | 1000 | 800 | 790 | 760 | 780 |
| Zeta potential isoelectric point (pH) | 5.2 | 4.6 | 4.8 | 4.8 | 4.6 | 4.9 | 5.0 | 5.6 | 5.6 | 5.6 |
| No. of peaks in the Ramen spectrum (No.) (measurement range: 1250 to 1700 cm$^{-1}$) | 2 | 3 | 3 | 3 | 3 | 3 | 3 | 3 | 3 | 3 |
| Methylene blue adsorption performance (mL/g) | 320 | 260 | 190 | 160 | 250 | 180 | 150 | 150 | 150 | 150 |
| Electrostatic capacitance (F/g) | 106 | 127 | 130 | 128 | 125 | 130 | 129 | 125 | 127 | 124 |

| | Standard | Comparative Example | | | | | | |
|---|---|---|---|---|---|---|---|---|
| | Example | 1 | 2 | 3 | 4 | 5 | 6 | 7 |
| Activated carbon | 85 | 84 | 82 | 80 | 78 | 76 | 74 | 70 |
| Polyaniline toluene dispersion (polyaniline content = 4.3 mass %) | — | 23.3 (1) | 69.8 (3) | 116.3 (5) | 162.8 (7) | 209.3 (9) | 255.8 (11) | 348.8 (15) |
| Method of preparing | — | D | D | D | D | D | D | D |
| Specific surface area (m²/g) | 1390 | 730 | 700 | 660 | 620 | 570 | 520 | 470 |

TABLE 1-continued

| | | | | | | | |
|---|---|---|---|---|---|---|---|
| Zeta potential isoelectric point (pH) | 5.2 | 5.8 | 5.8 | 6.0 | 6.1 | 6.1 | 6.2 | 6.3 |
| No. of peaks in the Ramen spectrum (No.) (measurement range: 1250 to 1700 cm$^{-1}$) | 2 | 3 | 3 | 3 | 3 | 3 | 3 | 3 |
| Methylene blue adsorption performance (mL/g) | 320 | 140 | 130 | 120 | 120 | 110 | 100 | 100 |
| Electrostatic capacitance (F/g) | 106 | 106 | 106 | 109 | 110 | 110 | 108 | 105 |

From the results shown in Table 1, it can be seen that for carbon material (electrode material) with three peaks in the Raman spectrum, small specific surface area, and methylene blue adsorption performance of less than 150 mL/g, in other words, carbon material which is considered to have conductive polymers adsorbed onto the surface of the activated carbon, the electrostatic capacitance evaluated by the three electrode method is about the same as that of the Standard Example (Comparative Examples 1 to 7).

In contrast, for carbon material (electrode material) with three peaks in the Raman spectrum, and specific surface area and methylene blue adsorption performance within the predetermined ranges, the electrostatic capacitance evaluated by the three electrode method was 15 to 30% higher compared with that of the Standard Example and the Comparative Examples (Working Examples 1 to 20).

In particular, by comparing Working Example 4 and the like with Working Example 18, comparing Working Example 13 and the like with Working Example 19, and comparing Working Example 16 and the like with Working Example 20, it can be seen that when the zeta potential isoelectric point is in the range pH 3.0 to pH 5.5, the electrostatic capacitance tends to be higher.

What is claimed is:

1. A method of manufacturing a carbon material comprising a composite of a porous carbon material and a conductive polymer,
the method comprising the steps of: (1) making a dispersion solution of porous carbon, (2) making a dispersion solution of the conductive polymer, and (3) mixing the dispersion solution of the porous carbon material and the dispersion solution of the conductive polymer to make the composite of the porous carbon material and the conductive polymer, the steps of (1) and (2) being in no particular order,
wherein the carbon material has a specific surface area of 750 to 3000 m$^2$/g,
the carbon material has a methylene blue adsorption performance of 150 mL/g or more, and
the carbon material has at least three peaks in a range 1250 to 1700 cm$^{-1}$ of a spectrum obtained by laser Raman spectroscopy with an excitation wavelength of 532 nm.

2. The method of manufacturing a carbon material according to claim 1, wherein the carbon material has a zeta potential isoelectric point within a range pH 3.0 to pH 5.5.

3. The method of manufacturing a carbon material according to claim 1, wherein the conductive polymer is a conductive polymer that includes a nitrogen atom and/or a conductive polymer that includes a sulfur atom.

4. The method of manufacturing a carbon material according to claim 3, wherein the conductive polymer that includes a nitrogen atom is at least one selected from the group consisting of polyaniline, polypyrrole, polypyridine, polyquinoline, polythiazole, polyquinoxaline, and derivatives thereof.

5. The method of manufacturing a carbon material according to claim 3, wherein the conductive polymer that includes a sulfur atom is at least one selected from the group consisting of polythiophene, polycyclopentadithiophene, and derivatives thereof.

6. The method of manufacturing a carbon material according to claim 1, wherein the conductive polymer is at least one selected from the group consisting of polyfluorene and derivatives thereof.

* * * * *